United States Patent [19]

Sawada et al.

[11] Patent Number: 4,670,790

[45] Date of Patent: Jun. 2, 1987

[54] TELEVISION RECEIVER PROVIDED WITH DELAY CIRCUIT

[75] Inventors: Shigeru Sawada, Iwai; Yoichi Utsumi, Noda, both of Japan

[73] Assignee: Victor Company of Japan, Ltd., Japan

[21] Appl. No.: 714,637

[22] Filed: Mar. 21, 1985

[30] Foreign Application Priority Data

Mar. 24, 1984 [JP] Japan .................................. 59-57094
Mar. 24, 1984 [JP] Japan .......................... 59-42430[U]

[51] Int. Cl.⁴ .............................................. H04N 5/44
[52] U.S. Cl. .................................... 358/188; 358/160; 358/21 R; 358/181
[58] Field of Search ...................... 358/36, 37, 40, 188, 358/335, 336, 337, 166, 167, 160, 21 R, 314, 222, 149, 181

[56] References Cited

U.S. PATENT DOCUMENTS

| | | | |
|---|---|---|---|
| 4,126,886 | 11/1978 | Takahara et al. | ..................... 358/337 |
| 4,410,914 | 10/1983 | Siau | ..................... 358/222 |
| 4,490,748 | 12/1984 | Kamath | ..................... 358/21 R X |

FOREIGN PATENT DOCUMENTS 3411963 10/1984 Fed. Rep. of Germany.
0062529 10/1982 United Kingdom.

Primary Examiner—Howard W. Britton
Assistant Examiner—Victor R. Kostak
Attorney, Agent, or Firm—Andrus, Sceales, Starke & Sawall

[57] ABSTRACT

A television receiver comprises a video signal processing circuit including a video signal demodulating circuit for generating three primary color signals from an input composite video signal, a delay circuit coupled in series to the video signal demodulating circuit within the video signal processing circuit, a parallel circuit system having virtually no delay time and coupled in parallel to the video signal processing circuit, and a picture tube applied with signals passed through a signal system of the video signal processing circuit and the parallel circuit system. The delay circuit has a delay time $\tau_b$ described by a relation $\tau_b \approx N\tau_H - \tau_a$, where N is a natural number including one, $\tau_H$ represents a horizontal scanning period and $\tau_a$ represents a delay time of the signal system of the video signal processing circuit.

8 Claims, 5 Drawing Figures

TELEVISION RECEIVER PROVIDED WITH DELAY CIRCUIT

BACKGROUND OF THE INVENTION

The present invention generally relates to television receivers provided with a delay circuit, and more particularly to a television receiver provided with a delay circuit for delaying a signal being transmitted through a video signal processing circuit systems, so that the signal transmitted through the video signal processing system is delayed by a natural number multiple one one horizontal scanning period with respect to a signal transmitted through a circuit system which is parallel to the video signal processing circuit.

Recently, the so-called digital television receiver is being reduced to practice. An analog video signal is converted into a digital signal, subjected to a predetermined signal processing, returned to an analog signal and then applied to the digital television receiver. According to the digital television receiver, the number of required parts and the number of required adjustments are reduced from the manufacturing point of view compared to the analog systetm. Further, the operation error in the digital television receiver is small compared to the analog system, and for this reason, the phrase characteristic and the signal-to-noise (S/N) ratio of the digital television receiver are more satisfactory compared to the analog system. It is possible to obtain a stable picture having a high picture quality. In addition, since the digital television receiver performs a digital signal processing, the digital television receiver can easily be coupled to a videotex, a teletext, a personal computer and the like.

A digital video signal processing cicuit within the digital television receiver of this type comprises an analog-to-digital (A/D) converter for converting an input analog video signal into a digital video signal, a digital filter for separating a chrominance signal and a luminance signal from the digital video signal, a digital filter for processing the luminance signal, an operation circuit for processing the chrominance signal so as to obtain digital primary color signals, a digital-to-analog (D/A) converter for converting the digital primary color signals into analog primary color signals and the like. A clock signal having a frequency which is an integral number multiple of a chrominance subcarrier frequency $f_{sc}$ (for example, $3f_{sc}$ or $4f_{sc}$) is used in the digital circuits within the digital video signal processing circuit, and for this reason, a time delay having a minimum unit of one period of the clock signal occurs in the digital video signal processing circuit. Accordingly, the digital video signal processing circuit as a whole has a delay time in the order of several microseconds.

On the other hand, a deflection circuit for producing horizontal and vertical deflection voltage signals to a deflection electrode of a picture tube is an analog circuit, and there is virtually no delay in the deflection circuit. Hence, when the primary color signals having delay and the deflection signals having virtually no delay are applied to the picture tube as they are, the reproduced picture is displayed on the picture tube at a position shifted to the right from a regular display position by a distance corresponding to the delay time of the digital video signal processing circuit.

Accordingly, in orer to correct the above described shift in the display position of the reproduced picture, a delay circuit is conventionally provided in series with the deflection circuit so as to delay the deflection signals by a delay time equal to the delay time of the digital video signal processing circuit. However, because the delay time of the digital video signal processing circuit is in the order of several microseconds and is large as described before, a delay device which requires a driving clock signal such as a charge coupled device (CCD) must be used for the delay circuit which is provided in series with the deflection circuit. Consequently, it becomes necessary to provide a driving circuit for driving the delay circuit, and there is a problem in that the circuit construction becomes complex.

On the other hand, in a case where a teletext decoder for separating a teletext signal from a composite video signal so as to obtain a character signal and for mixing the character signal with the primary color signals so as to supply the mixed signal to the picture tube, is an analog circuit, it is necessary to provide in series with the teletext decoder a delay circuit which has a delay time approximately the same as the delay time of the digital video signal processing circuit. In this case, it is necessary to provide a driving circuit for driving the delay circuit, as in the case described before. Therefore, there is a problem in that the circuit construction becomes complex.

A problem similar to that described before occurs regardless of whether the video signal processing circuit is a digital circuit, such as a case where the video signal processing circuit is an analog circuit using a transversal filter, for example, because the video signal processing circuit will have a relatively large delay time in this case. In addition, as for the coupling of the television receiver with an external device, the external device is not limited to the teletext decoder. For example, the television receiver may be coupled to a personal computer and may be supplied with a superimposing signal from the personal computer, and a problem similar to that described before also occurs in this case.

SUMMARY OF THE INVENTION

Accordingly, it is a general object of the present invention to provide a novel and useful television receiver provided with a delay circuit, in which the problems described heretofore are eliminated.

Another and more specific object of the present invention is to provide a television receiver provided with a delay circuit for delaying a signal being transmitted through a video signal processing circuit system, so that the signal transmitted through the video signal processing system is delayed by a natural number multiple (including one) of one horizontal scanning period with respect to a signal transmitted through a circuit system which is parallel to the video signal processing circuit. In other words, when the delay time of the video signal processing circuit is represented by $\tau_a$ and the horizontal scanning period is represented by $\tau_H$, the object of the present invention is to provide a television receiver provided with a delay circuit coupled in series with the video signal processing circuit, which delay circuit has a delay time $\tau_b$ which is described by a relation $\tau_b \approx N\tau_H - \tau_a$, where N is a natural number including one. According to the television receiver of the present invention, the entire video signal is delayed by approximately one or a plurality of horizontal scanning periods. Thus, no time difference is introduced with respect to a horizontal deflection signal, and the reproduced picture will not be displayed at a position slightly shifted to the right. The reproduced picture is displayed at a position shifted upwardly or downwardly by an even number of horizontal scanning lines, but such a shift in the vertical direction does not introduce problems from the practical point of view. Moreover, since the delay circuit is driven by a clock signal which is obtained from a clock signal generating circuit which is originally provided in the video signal processing circuit, it is unnecessary to provide a driving circuit exclusively for driving the delay circuit. In addition, according to the needs, a video signal demodulating circuit within the video signal processing circuit and the delay circuit may be manufactured in the form of a single integrated circuit.

Other objects and further features of the present invention will be apparent from the following detailed description when read in conjunction with the accompanying drawings.

DETAILED DESCRIPTION

Figure 1:
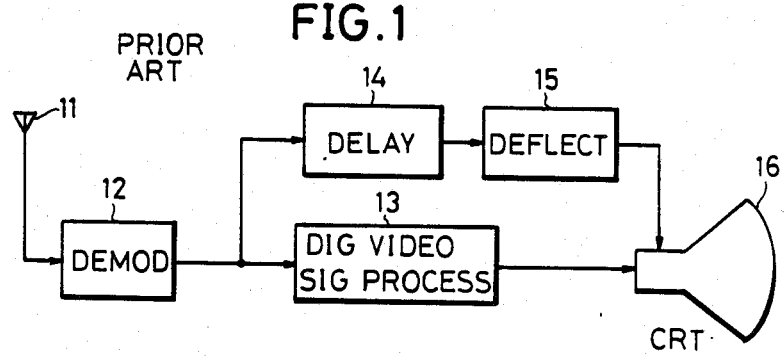
FIG. 1 is a general system block diagram showing an example of a conventional digital television receiver.

An example of a conventional digital television receiver is shown in FIG. 1. A television signal received through an antenna 11 is demodulated in a demodulator 12. A composite video signal produced from the demodulator 12 is supplied to a digital video signal processing circuit 13 and a delay circuit 14.

The digital video signal processing circuit 13 comprises an A/D converter for converting an input analog composite video signal into a digital composite video signal, a digital filter for separating a chrominance signal and a luminance signal from the digital composite video signal, a digital filter for processing the luminance signal, an operation circuit for processing the chrominance signal so as to obtain primary color signals, a D/A converter for converting the digital primary color signals into analog primary color signals and the like. As described before, the digital video signal processing circuit 13 uses a clock signal having a frequency which is an integral multiple (for example, $3f_{sc}$ or $4f_{sc}$) of the chrominance subcarrier frequency $f_{sc}$, and has a time delay having a minimum unit of one period of the clock signal. Accordingly, the digital video signal processing circuit 13 as a whole has a delay time in the order of several microseconds.

The delay circuit 14 has a delay time identical to the delay time of the digital video signal processing circuit 13. The composite video signal from the delay circuit 14, which is matched to the timing of the signal from the digital video signal processing circuit 13, is supplied to a deflection circuit 15 wherein deflection signals are generated based on synchronizing signals separated from the composite video signal. The output signal of the digital video signal processing circuit 13 is supplied to a picture tube 16 and is displayed as a reproduced picture on the picture tube 16 which is driven responsive to the deflection signals from the deflection circuit 15.

Because the deflection circuit 15 processes analog signals, the delay time of the deflection circuit 15 is extremely small and therefore negligible. Accordingly, a delay circuit having a large delay time in the order of several microseconds must be used for the delay circuit 14. For example, a delay device such as a CCD must be used for the delay circuit 14. As a result, it becomes necessary to provide a driving circuit or the like for supplying a driving clock signal to the delay circuit 14, and there is a problem in that the circuit construction becomes complex.

Figure 2:
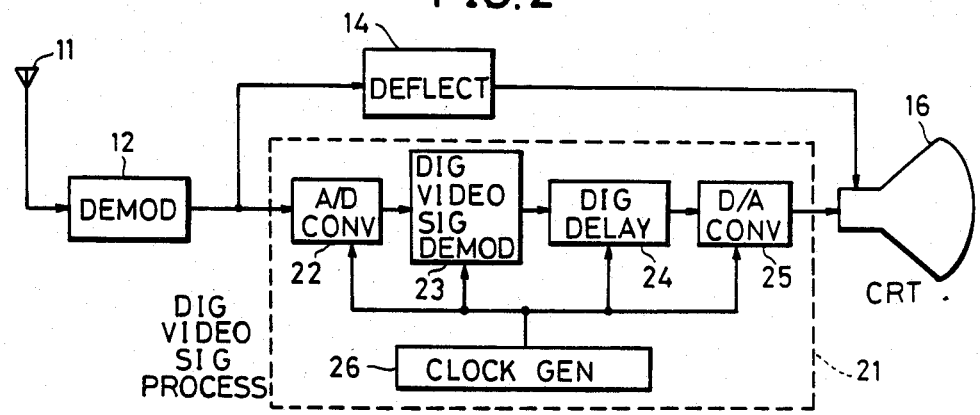
FIG. 2 is a general system block diagram showing a first embodiment of a television receiver according to the present invention.

The present invention eliminates the above described problem of the conventional television receiver. A description will now be given with respect to a first embodiment of the television receiver according to the present invention by referring to FIG. 2. In FIG. 2, those parts which are the same as those corresponding parts in FIG. 1 are designated by the same reference numerals. The television signal received through the antenna 11 is supplied to the demodulator 12. In the demodulator 12, a television signal of a desired channel is selected by the tuning, an intermediate frequency signal is obtained. As a result, a composite video signal is produced from the demodulator 12. The output composite video signal of the demodulator 12 is supplied to the deflection circuit 14 and a digital video signal processing circuit 21.

The composite video signal supplied to the digital video signal processing circuit 21 is converted into a digital composite video signal in an A/D converter 22, and the digital composite video signal is supplied to a digital video signal demodulating circuit 23. The digital composite video signal is separated into the chrominance signal component and the luminance signal component in respective digital filters within the digital composite video signal demodulating circuit 23 for separating the chrominance signal and the luminance signal. The separated chrominance signal component is demodulated in an operation circuit within the digital composite video signal demodulating circuit 23 for demodulating the chrominance signal. The separated luminance signal component is processed in a digital filter within the digital composite video signal demodulating circuit 23 for processing the luminance signal and is mixed in a matrix circuit within the digital composite video signal demodulating circuit 23 with the chrominance signal component from the operation circuit. Thus, three digital primary color signals are obtained from the matrix circuit.

The digital primary color signals are supplied to a digital delay circuit 24 which constitutes an essential part of the television receiver according to the present invention. For example, the digital delay circuit 24 is constituted by a shift register. A clock signal generating circuit 26 supplies a clock signal to the A/D converter 22, the digital filters and the operation circuit within the digital video signal demodulating circuit 23, and a D/A converter 25, and this clock signal is also supplied to the digital delay cicuit 24 as a driving clock signal.

When it is assumed that a delay introduced in the signal which passes through the A/D converter 22, the digital video signal demodulating circuit 23 and the D/A converter 25 is represented by $\tau_{a1}$ and one horizontal scanning period of represented by $\tau_H$, a delay time $\tau_{b1}$ of the digital delay circuit is set to satisfy the following relation (1), where N is a natural number and is equal to one, for example.

$$\tau_{b1} \approx N\tau_H - \tau_{a1} \qquad (1)$$

The digital primary color signals which are delayed by the delay time $\tau_{b1}$ in the digital delay circuit 24 are supplied to the D/A converter 25 and are converted into three analog primary color signals. The three analog primary color signals from the D/A converter 25 are supplied to a cathode of the picture tube 16. Because the delay time $\tau_{b1}$ of the digital delay circuit 24 is set in the manner described above, the output signal of the digital video signal processing circuit 21, which signal has passed through the A/D converter 22, the digital video signal demodulating circuit 23, the digital delay circuit 24 and the D/A converter 25, is delayed by a delay time $N\tau_H$ (for example, $\tau_H$) with respect to the input signal of the digital video signal processing circuit 21.

On the other hand, the deflection circuit 14 separates the horizontal and vertical synchronizing signals from the composite video signal, and generates the horizontal and vertical deflection signals. The horizontal and vertical deflection signals are applied to a horizontal deflection coil and a vertical deflection coil of the picture tube 16, respectively.

The signal passing through the deflection circuit 14 is an analog signal, and deflection circuit 14 is constituted by a normal analog circuit. Accordingly, the signal passing through the deflection circuit 14 is subjected to virtually no delay. Thus, the primary color signals applied to the picture tube 16 are delayed by a delay time $N\tau_H$ with respect to the horizontal and vertical deflection signals from the deflection circuit 14.

Therefore, the position where the reproduced picture is displayed on the picture tube 16 is not shifted in the horizontal direction, and is shifted in the vertical direction by N horizontal scanning lines (by 2N scanning lines when the interlaced scanning is taking into account). However, such a vertical shift in the position where the reproduced picture is displayed on the picture tube 16 by several horizontal scanning lines, does not introduce problems from the practical point of view.

According to the present embodiment, the clock signal which drives the digital delay circuit 24 is obtained from the clock signal generating circuit 26 which is provided for the purpose of driving the A/D converter 22, the digital video signal demodulating circuit 23 and the D/A converter 25. Hence, it is unnecessary to provide a driving circuit exclusively for the digital delay circuit 24. In addition, it is possible to manufacture the digital video signal demodulating circuit 23 and the digital delay circuit 24 in the form of a single integrated circuit, and in this case, the manufacturing cost can be kept low.

Figure 3:
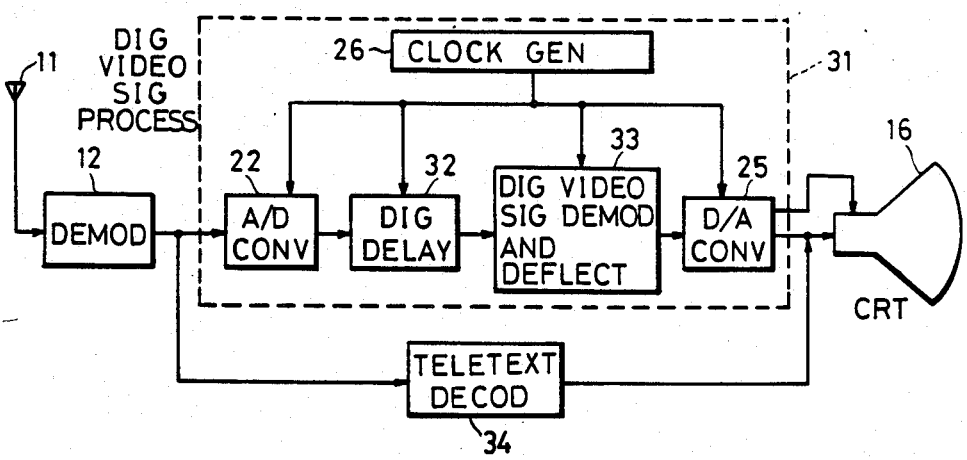
FIG. 3 is a general system block diagram showing a second embodiment of a television receiver according to the present invention.

Next, a description will be given with respect to a second embodiment of the television receiver according to the present invention by referring to FIG. 3. In FIG. 3, those parts which are the same as those corresponding parts in FIG. 2 are designated by the same reference numerals, and their description will be omitted. The present embodiment relates to a case where the television receiver is used to receive a television signal of a teletext. The output signal of the demodulating circuit 12 is supplied to a digital video signal processing circuit 31 and to a teletext decoder 34.

The composite video signal supplied to the digital video signal processing circuit 31 is converted into a digital signal in the A/D converter 22. The output digital signal of the A/D converter 22 is delayed in a digital delay circuit 32 and is then supplied to a digital video signal demodulating and deflection circuit 33 wherein digital primary color signals and digital deflection signals are generated. Output signals of the digital video signal demodulating and deflection circuit 33 are converted into analog signals in the D/A converter 25. Output analog primary color signals of the D/A converter 25 are supplied to the cathode of the picture tube 16, and output analog deflection signals of the D/A converter 25 are supplied to deflection coils of the picture tube 16.

A delay time $\tau_{b2}$ of the digital delay circuit 32 is set to a value satisfying the following relation (2), where $\tau_{a2}$ represents a total delay time of a circuit part constituted by the A/D converter 22, the digital video signal demodulating and deflection circuit 33, and the D/A converter 25.

$$\tau_{b2} \approx N\tau_H - \tau_{a2} \qquad (2)$$

Accordingly, the output signals of the digital video signal processing circuit 31 are delayed by a delay time $N\tau_H$ with respect to the input signal of the digital video signal processing circuit 31.

On the other hand, a character signal which is multiplexed to the composite video signal, is separated from the composite video signal in the teletext decoder 34. In most cases, the teletext decoder 34 is coupled to the television receiver as an external device. The teletext decoder 34 processes an analog signal, and the teletext decoder 34 is constituted by an analog circuit. For this reason, virtually no delay is introduced in the teletext decoder 34. The character signal obtained from the teletext decoder 34 is multiplexed with the output primary color signals of the digital video signal processing circuit 31 and supplied to the picture tube 16.

The output signals of the digital video signal processing circuit 31 are delayed by a delay time $N\tau_H$ with respect to the output signal of the teletext decoder 34. Accordingly, the position where the reproduced picture is displayed on the picture tube 16 will not shift in the horizontal direction with respect to the character display of the teletext. The position where the reproduced picture is displayed on the picture tube 16 will be shifted in the vertical direction by several horizontal scanning lines, however, such a vertical shift do not introduced problems from the practical point of view.

In the embodiments described heretofore, the horizontal scanning period $\tau_H$ is equal to 63.5 microseconds in the case where the composite video signal is of the NTSC system. When the delay times $\tau_{a1}$ and $\tau_{a2}$ are equal to 4.5 microseconds, for example, the delay times $\tau_{b1}$ and $\tau_{b2}$ of the digital relay circuits 24 and 32 are set to 59 microseconds. In this case, the natural number N is equal to one.

For example, a VPU (CVPU2210) manufactued by ITT of the United States may be used for the digital video signal demodulating circuit 23. Further, a coupled circuit comprising the VPU and a DPU (DPU2500) manufactured by ITT of the United States may be used for the digital video signal demodulating and deflection circuit 33. In addition, the digital delay circuits 24 and 32 are not limited to shift registers, and may be a delay circuit constituted by a charge transfer device such as a CCD.

In a case where the video signal demodulating circuit 23 shown in FIG. 2 is constituted by an analog circuit which requires a clock signal, such as a transversal filter, it is unnecessary to provide the A/D converter 22 and the D/A converter 25. In this case, a delay cicuit constituted by a charge transfer device such as a CCD and a bucket brigade device (BBD) is coupled in series with the analog demodulating circuit such as the transversal filter, so that the delay circuit is driven by the clock signal of the analog circuit such as the transversal filter. In this case, it is also unnecessary to provide a driving circuit exclusively for driving the delay circuit, and the analog demodulating circuit and the delay circuit can be manufactured in the form of a single integrated circuit. A similar modification may be made with respect to the circuit shown in FIG. 3.

Next, a description will be given with respect to a third embodiment which is suited for aplication in a display apparatus which is coupled to an external device such as a personal computer.

In order to facilitate the understanding of the present embodiment, a description will first be given with respect to a conventional example in which the display apparatus is coupled to an external device. In the conventional example shown in FIG. 4, a composite video signal applied to an input terminal 41 is supplies to a video signal processing circuit 42 and a synchronizing signal separating circuit 44. The composite video signal is subjected to a predetermined signal processing in the video signal processing circuit 42 and is formed into three primary color signals. The primary color signals are passed through a switch 43 which is connected to a terminal a when the video signal is to be received, and is supplied to the picture tube 16.

A composite synchronizing signal which is separated from the composite video signal in the synchronizing signal separating circuit 44, is passed through a switch 45 and is supplied to a delay circuit 46. The composite synchronizing signal is delayed in the delay circuit 46 and is then supplied to a deflection circuit 47. Deflection signals which are generated from the delayed composite synchronizing signal in the deflection circuit 47, are applied to deflection coils of the picture tube 16.

In a case where the video signal processing circuit 42 is constituted by a digital circuit, the video signal processing circuit 42 introduces a time delay in the order of several microseconds as in the case of the embodiments described before. On the other hand, in a case where the video signal processing circuit 42 is constituted by an analog circuit, the video signal processing circuit 42 introduces a time delay in the order of several hundreds of nanoseconds because a filter for eliminating the carrier chrominance signal and a delay circuit are provided in the luminance signal system. Accordingly, the delay circuit 46 is provided to introduce a delay which is the same as the delay introduced in the video signal processing circuit 42.

On the other hand, input terminals 48 and 51 are coupled to an external device such as a microcomputer. For example, a superimposing signal and other picture signals are applied to the input terminal 48, and a composite synchronizing signal is applied to the input terminal 51. When the superimposing signal is applied to the input terminal 48 from the external device, the switches 43 and 45 are each switched and connected to a terminal b within one horizontal scanning period. The picture signal from the input terminal 48 is passed through an input circuit 49 and is supplied to a delay cicuit 50. An output delayed picture signal of the delay circuit 50 is passed through the switch 43 and is applied to the picture tube 16. In a case where the superimposing signal is obtained from a microcomputer, the composite video signal from the input terminal 41 and the composite synchronizing signal from the input terminal 51 are synchronized with each other, and the signal from the input terminal 41 and the signal from the microcomputer are switched within one horizontal scanning period and displayed on the picture tube 16. For this reason, the delay circuit 50 is provided so as to introduce in the signal from the input circuit 49 the same delay time as the signal which has passed through the video signal processing circuit 42. According to a known means, the switches 43 and 45 are switched between the terminals a and b within each of the horizontal scanning periods depending on the picture content of the superimposing signal.

The composite synchronizing signal from the input terminal 51 is passed through an input circuit 52 and is supplied to the delay circuit 46 through the switch 45, and the deflection signals from the deflection circuit 47 are applied to the picture tube 16. In order to prevent the three primary color signals of wide bands from the external device from becoming band-limited, it is necessary to use for the delay circuit 50 a delay circuit which has a flat frequency characteristic throughout a wide frequency range. In addition, a delay element must be provided independently for each of three signal systems for the three primary color signals. Especially in a case where the video signal processing circuit 42 is constituted by a digital circuit (or by an analog circuit using a transversal filter or the like) and the delay introduced therein is large, there is a problem in that an expensive CCD or the like must be used for the delay circuit 50.

Figure 4:
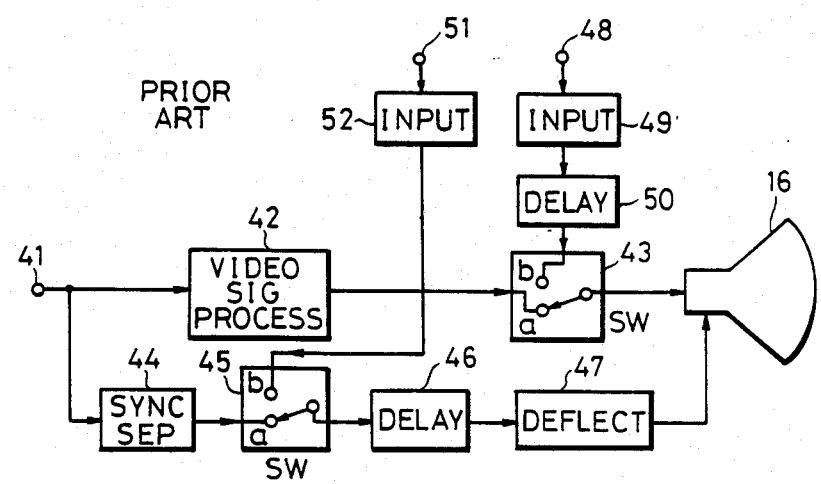
FIG. 4 is a general system block diagram showing another example of a conventional television receiver.
Figure 5:
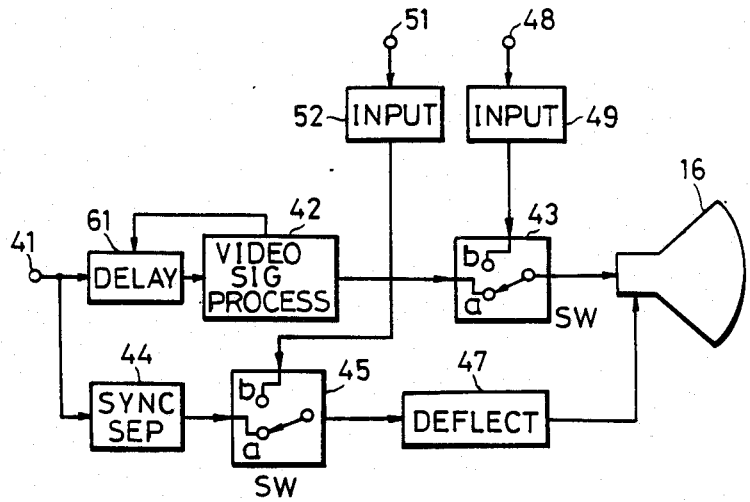
FIG. 5 is a system block diagram showing a third embodiment of the television receiver according to the present invention.

The third embodiment in which the above described problem is eliminated, will now be described in conjunction with FIG. 5. In FIG. 5, those parts which are the same as those corresponding parts in FIG. 4 are designated by the same reference numerals, and their description will be omitted.

In FIG. 5, the composite video signal from the input terminal 41 is supplied to the synchronizing signal separating circuit 44 and a delay circuit 61. An output delayed composite video signal of the delay circuit 61 is supplied to the video signal processing circuit 42. The three primary color signals generated in the video signal processing circuit 42 are passed through the switch 43 which is connected to the terminal a and are supplied to the picture tube 16. The composite synchronizing signal which is separated in the synchronizing signal separating circuit 44 is supplied to the deflection circuit 47 through the switch 45 which is connected to the terminal a. The output deflection signals of the deflection circuit 47 are applied to the picture tube 16.

A delay time $\tau_2$ of the delay circuit 61 is set to satisfy the following relation (3), where $\tau_1$ represents the delay time of the video processing circuit 42.

$$\tau_2 \approx N\tau_H - \tau_1 \quad (3)$$

Because the delay circuit 61 is driven by a clock signal from a clock signal generating circuit within the video signal processing circuit 42, it is unnecessary to provide a driving circuit exclusively for driving the delay circuit 61.

According to the present embodiment, it is unnecessary to provide the delay circuits 46 and 50 of the conventional example shown in FIG. 4, and the circuit construction is simple compared to the conventional example. In addition, according to the present embodiment, the output signal of the video signal processing circuit 42 is delayed by a delay time $N\tau_H$ with respect to the output signal of the deflection circuit 47, and the position where the reproduced picture is displayed on the picture tube 16 is not shifted in the horizontal direction but is shifted in the vertical (downward) direction by several horizontal scanning lines as in the case of the embodiments described before. However, such a downwardly shift of the display postion of the reproduced picture by several horizontal scanning lines, does not introduce problems from the practical point of view.

For example, a composite video signal obtained by detecting an NSC system television video signal has a band under an upper limit frequency of approximately 4.5 MHz which is narrower than the band of the three primary color signals from the external device. Thus, unlike in the case of the conventional delay circuit 501, it is unnecessary to use an expensive delay circuit having a flat frequency characteristic throughout a wide frequency range for the delay circuit 60. In addition, the delay element need only be provided in one signal system, and the apparatus can be manufactured at a low cost.

The three primary color signals and the composite synchronizing signal applied to the input terminals 48 and 51 are not limited to the superimposing signal described before, and may be a picture signal which is not in synchronism with the composite video signal applied to the input terminal 41. In this case, the switches 43 and 45 are each maintained in the state connected to the terminal b, so that only the picture from the external device is displayed on the picture tube 16.

The delay circuit 61 need not be constituted by a single circuit, and may be constituted by a plurality of delay circuits. In other words, the delay circuit 61 is not limited to that of the embodiment described before, and may be constituted by a plurality of delay circuits built into the video signal processing circuit 42 so that a total delay time of the plurality of delay circuits becomes equal to the delay time $\tau_2$.

In each of the embodiments described heretofore, the digital delay circuit 24 shown in FIG. 2 may be coupled in a stage prior to the digital video signal demodulating circuit 23, the digital delay circuit 32 shown in FIG. 3 may be coupled in a stage subsequent to the digital video signal demodulating and deflection circuit 33, and the delay circuit 61 may be coupled in a stage subsequent to the video signal processing circuit 42. That is, the delay circuit simply needs to be coupled directly or indirectly in series to the video signal demodulating circuit within the video signal processing circuit.

Further, the present invention is not limited to these embodiments, but various variations and modifications may be made without departing from the scope of the present invention.

What is claimed is:

1. A television receiver comprising:
   a video signal processing circuit including a video signal demodulating circuit for generating a demodulated video signal from an input composite video signal;
   a delay circuit coupled in series to the video signal demodulating circuit within said video signal processing circuit;
   a parallel circuit system having virtually no delay time, said parallel circuit system being coupled in parallel to said video signal processing circuit; and
   a picture tube applied with a signal passed through said video signal processing circuit including said delay circuit and a signal passed through said parallel circuit system,
   said delay circuit having a delay time $\tau_b$ described by a relation $\tau_b \approx N\tau_H - \tau_a$, where N is a natural number including one, $\tau_H$ represents a delay time of said video signal processing circuit.

2. A television receiver as claimed in claim 1 in which said video signal processing circuit comprises an analog-to-digital converter for converting said input composite video signal which is an analog signal into a digital signal, a digital video signal demodulating circuit for generating a demodulated digital video signal from the output digital signal of said analog-to-digital converter, a digital-to-analog converter for converting the output demodulated digital video signal of said digital video signal demodulating circuit into an analog video signal, and a clock signal generating circuit for supplying a clock signal to said analog-to-digital converter, said digital video signal demodulating circuit and said digital-to-analog converter, and said delay circuit is coupled in series with said digital video signal demodulating circuit and is driven by the clock signal from said clock signal generating circuit.

3. A television receiver as claimed in claim 2 in which said parallel circuit system comprises a deflection circuit supplied with said analog input composite video signal for separating a composite synchronizing signal from said analog input composite video signal so as to generate deflection signals, said picture tube receiving the output deflection signals of said deflection circuit.

4. A television receiver as claimed in claim 1 in which said video signal processing circuit comprises an analog-to-digital converter for converting said input composite video signal which is an analog signal into a digital signal, a digital video signal demodulating and deflection circuit for generating a demodulated digital video signal and digital deflection signals from the output digital signal of said analog-to-digital converter, a digital-to-analog converter for converting the output demodulated digital video signal and the output digital deflection signals of said digital video signal demodulating and deflection circuit into an analog video signal and analog deflection signals, and a clock signal generating circuit for supplying a clock signal to said analog-to-digital converter, said digital video signal demodulating and deflection circuit and said digital-to-analog converter, and said delay circuit is coupled in series with said digital video signal demodulating and deflection circuit and is driven by the cock signal from said clock signal generating circuit.

5. A television receiver as claimed in claim 4 in which said input composite video signal is multiplexed with character information, said parallel circuit system comprises a decoder for obtaining the character information multiplexed in said input composite video signal, and an output signal of said decoder is multiplexed with the output analog video signal of said video signal processing circuit and applied to said picture tube.

6. A television receiver as claimed in claim 5 in which said decoder is coupled to said video signal processing circuit as an external device.

7. A television receiver as claimed in claim 1 in which said video signal processing circuit comprises a first switch, said parallel circuit system comprises a second switch and a deflection circuit supplied with said input composite video signal which is an analog signal for separating a composite synchronizing signal from said input composite video signal so as to generate deflection signals, said picture tube receiving the output deflection signals of said deflection circuit, and picture information from an external device which is external to said television receiver is applied to said picture tube by the switching of said first switch and a composite synchronizing signal from the external device is applied to said deflection circuit by the switching of said second switch.

8. A television receiver as claimed in claim 7 in which said external device comprises a microcomputer, said picture information supplied to said first switch is a superimposing signal from said microcomputer, and said first and second switches are switched for every time period within one horizontal scanning period.

* * * * *